(12) United States Patent
Wiedemann et al.

(10) Patent No.: US 10,885,938 B1
(45) Date of Patent: Jan. 5, 2021

(54) TAPE GRIPPER CARTRIDGE CACHE

(71) Applicant: International Business Machines Corporation, Armonk, NY (US)

(72) Inventors: Stefan Wiedemann, Kaiserslautern (DE); Erik Rueger, Ockenheim (DE); Markus Schäfer, Heiligenmoschel (DE); Robert Beiderbeck, Wassenberg (DE); Ole Asmussen, Henstedt-Ulzburg (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/693,531

(22) Filed: Nov. 25, 2019

(51) Int. Cl.
*G11B 15/68* (2006.01)
*G06F 3/06* (2006.01)

(52) U.S. Cl.
CPC ........ *G11B 15/6885* (2013.01); *G06F 3/0611* (2013.01); *G06F 3/0658* (2013.01); *G06F 3/0686* (2013.01); *G11B 15/6805* (2013.01); *G11B 15/6895* (2013.01)

(58) Field of Classification Search
CPC . G11B 15/6835; G11B 17/225; G11B 17/228; G11B 15/6825
See application file for complete search history.

(56) References Cited

U.S. PATENT DOCUMENTS

| | | | | |
|---|---|---|---|---|
| 4,802,035 A | * | 1/1989 | Ohtsuka | G11B 15/6835 360/92.1 |
| 4,910,619 A | * | 3/1990 | Suzuki | G11B 15/6835 360/92.1 |
| 5,050,020 A | * | 9/1991 | Campbell | G11B 15/681 360/71 |
| 5,144,506 A | * | 9/1992 | Sahota | G11B 15/6885 360/92.1 |
| 5,345,350 A | * | 9/1994 | Ellis | G11B 15/6835 360/92.1 |
| 5,418,664 A | * | 5/1995 | Ostwald | G11B 15/6835 360/92.1 |

(Continued)

OTHER PUBLICATIONS

"Cartridge accessor", IBM Knowledge Center, TS4500, Overview, Tape library structure, 4 pages, retrieved from the internet on Aug. 16, 2019, <https://www.ibm.com/support/knowledgecenter/en/STQRQ9/com.ibm.storage.ts4500.doc/ts4500_opg_3584_xtcca.html>.

(Continued)

*Primary Examiner* — Brian E Miller
(74) *Attorney, Agent, or Firm* — Maeve M. Carpenter; William H. Hartwell (57) ABSTRACT

An apparatus for big data tape management tape cartridge management. The apparatus includes a tape gripper for storing one or more additional tape cartridges within a housing of the tape gripper, wherein the housing of the tape gripper includes a tape cartridge cache, where the tape cartridge cache is a modification to the housing of the tape gripper for holding the one or more additional tape cartridges stacked internally within the tape gripper, the tape cartridge cache is affixed to a bottom portion of the housing of the tape gripper, and the tape cartridge cache includes a plate, oriented above and centered to the tape cartridge cache, capable of being raised and lowered within the tape cartridge cache utilizing one or more springs mounted under the plate inside the tape cartridge cache.

19 Claims, 4 Drawing Sheets

(56) References Cited

U.S. PATENT DOCUMENTS

| | | | | | |
|---|---|---|---|---|---|
| 5,610,882 | A | * | 3/1997 | Dang | G11B 15/6835 360/92.1 |
| 5,652,682 | A | * | 7/1997 | Elliott | G11B 15/6835 360/92.1 |
| 5,742,570 | A | * | 4/1998 | Taki | G11B 15/6835 360/92.1 |
| 5,781,367 | A | * | 7/1998 | Searle | G11B 15/70 360/92.1 |
| 5,892,750 | A | * | 4/1999 | Barkley | G11B 17/225 360/92.1 |
| 5,933,396 | A | * | 8/1999 | Hammar | G11B 17/228 360/92.1 |
| 6,064,544 | A | * | 5/2000 | Wada | G11B 15/6835 360/92.1 |
| 6,243,332 | B1 | * | 6/2001 | Dimitri | G11B 15/6825 369/30.31 |
| 6,433,954 | B1 | * | 8/2002 | Rinard | G11B 15/6825 206/387.15 |
| 6,900,960 | B2 | * | 5/2005 | Gariepy | G11B 15/6835 360/92.1 |
| 7,472,405 | B2 | * | 12/2008 | Pierce | G11B 15/6835 369/30.43 |
| 7,707,596 | B1 | * | 4/2010 | Grow | G11B 17/225 360/93 |
| 8,139,314 | B2 | | 3/2012 | Green | |
| 8,213,108 | B2 | * | 7/2012 | Noguchi | G11B 17/221 360/92.1 |
| 8,824,250 | B2 | * | 9/2014 | Yoo | G11B 17/228 369/30.06 |
| 9,196,290 | B2 | * | 11/2015 | Hashimoto | G11B 15/6835 |
| 2003/0063411 | A1 | * | 4/2003 | Ostwald | G11B 15/6825 360/92.1 |
| 2010/0080091 | A1 | * | 4/2010 | Compton | G11B 15/6835 369/30.43 |
| 2012/0076621 | A1 | * | 3/2012 | Thompson | G11B 15/689 414/267 |
| 2012/0236434 | A1 | | 9/2012 | Jesionowski | |
| 2014/0126340 | A1 | * | 5/2014 | Yoo | G11B 17/225 369/30.06 |

OTHER PUBLICATIONS

"High-density technology", IBM Support Knowledge Center, TS4500, Overview, Tape library structure, 4 pages, retrieved from the internet on Aug. 16, 2019, <https://www.ibm.com/support/knowledgecenter/en/STQRQ9/com.ibm.storage.ts4500.doc/ts4500_ipg_3584_hdtech.htm>.

"IBM 3590-ACF Autoloader for 3590-X1A Drives", Midland Information Systems, Inc., 4 pages, retrieved from the internet on Aug. 15, 2019, <https://www.midlandinfosys.com/lenovo/ibm-3590-acf-autoloader-for-3590-x1a-drives.html>.

* cited by examiner

TAPE GRIPPER CARTRIDGE CACHE

BACKGROUND OF THE INVENTION

The present invention relates generally to tape cartridge management, and more particularly to additional cartridge storage space in a tape library frame.

The growing volume of data, and the storage capacity to service information technology, has increased over the years. Other significant trends that affect planning storage strategies include data migration to cloud services and storage virtualization.

Tape cartridges have traditionally been used for video archives, back-up files, replicas for disaster recovery and retention of information on premise, but the industry is also expanding to off-premise applications in the cloud.

Tape cartridges are usually stored in huge enterprise tape libraries. In order to preserve these tape cartridges, high density tape library frames containing high density (HD) tape cartridge slots are utilized, where a single HD tape cartridge slot can hold up to five tape cartridges stacked in a row, instead of a single tape to a storage slot.

SUMMARY

Aspects of an embodiment of the present invention disclose a method and an apparatus for tape cartridge management. Responsive to receiving a mount request, the method includes moving a tape gripper including a tape cartridge cache to a high density storage slot containing a first requested tape cartridge. The method includes removing the first requested tape cartridge from the storage slot utilizing a first gripper finger and a gripper finger opposite the first gripper finger to grasp the first requested tape cartridge. The method includes loading the first requested tape cartridge into the tape gripper to a position on a plate above the tape cartridge cache utilizing an electric motor to move the first gripper finger and the gripper finger opposite the first gripper finger inward along a belt track. Responsive to the mount request designating that the first requested tape cartridge is to be stored in the tape cartridge cache, the method includes releasing the first requested tape cartridge on the plate and caching the first requested tape cartridge into the tape cartridge cache utilizing a first tapered portion of a gripper finger module housing, oriented towards an open portion of the housing of the tape gripper.

DETAILED DESCRIPTION

Embodiments of the present invention recognize that a tape library, including one or more interconnected tape library frames, can store a plurality of tape cartridges in high density (HD) slots. Embodiments of the present invention recognize that whenever a tape cartridge stored in a rearmost storage position within a HD slot is requested, all tape cartridges forward of that tape cartridge have to be removed, and therefore a so-called shuffle space is required to provide space for holding the tape cartridges forward of the requested tape cartridge (last tape cartridge in the HD slot). Embodiments of the present invention recognize that cartridge shuffling, and shuffle space can be time consuming and inefficient. Embodiments of the present invention further recognize that having only two tape grippers is disadvantageous as tape cartridge put and get times are limited by the tape grippers, as a maximum of only two tape cartridges (four where a dual accessor is used) can be moved at one time. Embodiments of the present invention recognize these limitations in tape libraries that house many tape cartridges and tape drives. Additionally, embodiments of the present invention recognize that typically a scratch tape cartridge is required for database backup jobs, and such jobs may have high priority and therefore end up blocking other customer backup jobs. Moreover, these scratch tape cartridges may be widespread throughout a tape library, and retrieving and loading them puts additional resource strain on the tape library.

Embodiments of the present invention provide the capability to affix additional tape cartridge storage space directly on to a tape gripper that functions as a cache space for one or more tape cartridges during put and get operations. Embodiments of the present invention provide the capability for dual tape grippers to access tape cartridges independently on a single tape cartridge location (e.g., HD slot). Embodiments of the present invention provide the capability to utilize this additional tape cartridge storage space affixed directly to a tape gripper to eliminate the need for shuffle space (deep slot shuffle) during tape cartridge shuffle operations, decrease tape cartridge put and get time, and decrease customer data access time.

Implementation of such embodiments may take a variety of forms, and exemplary implementation details are discussed subsequently with reference to the Figures.

Figure 1:
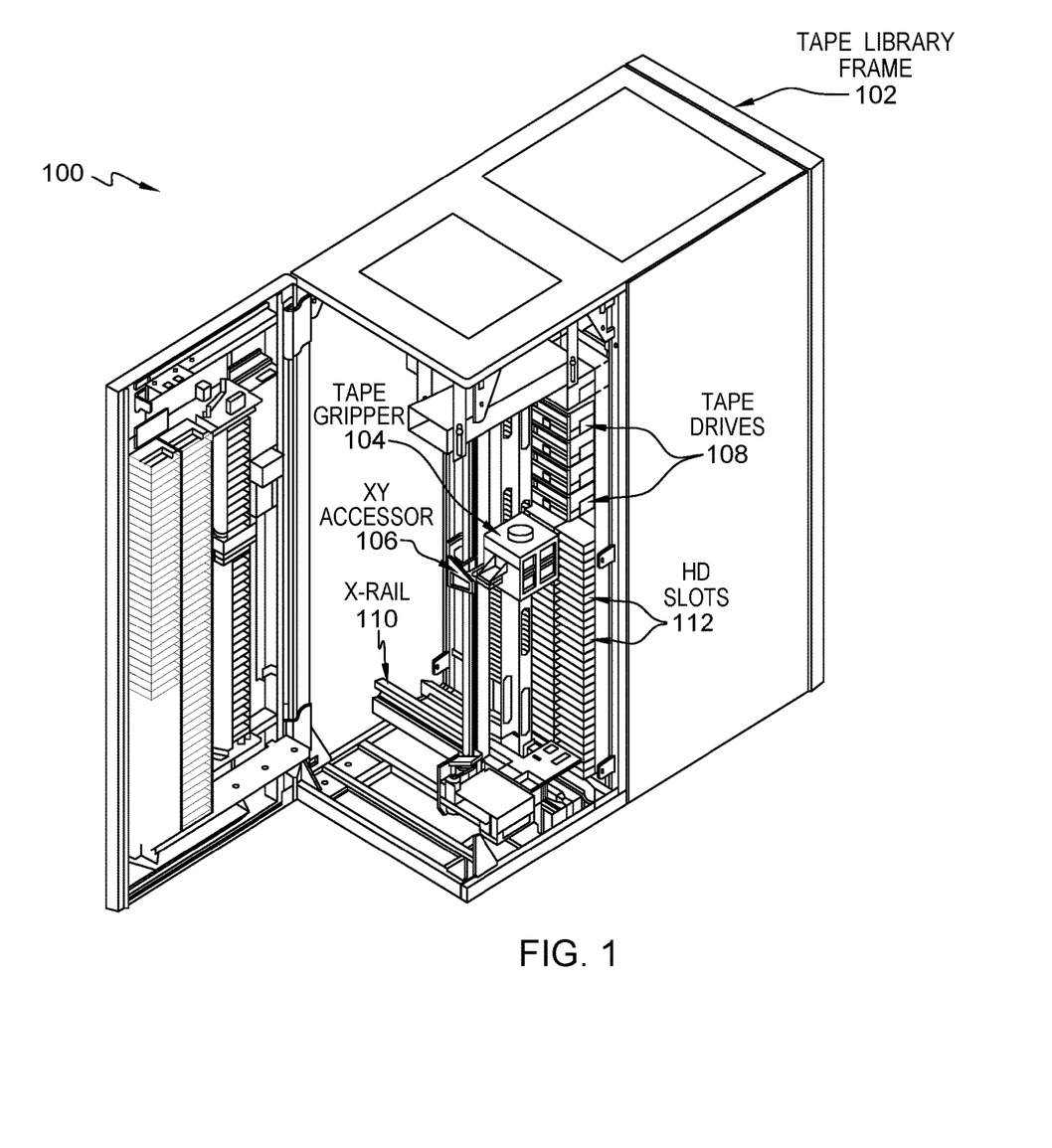
FIG. 1 illustrates a tape cartridge management environment, in accordance with an embodiment of the present invention.

Referring now to various embodiments of the invention in more detail, FIG. 1 is a functional block diagram that illustrates a portion of a tape cartridge management environment, generally designated 100, suitable for providing additional tape cartridge storage space directly available on a tape gripper, in accordance with at least one embodiment of the invention. In one embodiment, tape cartridge management environment 100 includes a tape library frame, such as tape library frame 102. In one embodiment, a plurality of tape library frames, such as tape library frame 102, can be interconnected to form one or more tape libraries. The one or more tape libraries can be organized into a plurality of columns evenly spaced within a floor space (i.e., within a designated space within, for example, a building, a warehouse, etc.). In another embodiment, one or more tape library frames, such as tape library frame 102, may be stacked atop the one or more tape libraries organized into the plurality of columns to satisfy demands imposed by future growth of tape cartridge management, within existing floor space, by effectively building up, as opposed to building out. In one embodiment, tape library frame 102 includes one or more components, including, but not limited to, a tape gripper 104, an XY accessor 106, one or more tape drives, such as tape drives 108, an X-rail 110, and one or more high density (HD) storage slots, such as HD slots 112. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

In one embodiment, tape gripper 104 is an assembly within a tape library frame, such as tape library frame 102, for retrieving one or more tape cartridges from a plurality of tape cartridge storage slots within a tape library or one or more interconnected tape library frames similar to tape library frame 102. In one embodiment, tape gripper 104 is an assembly within tape library frame 102 for retrieving one or more tape cartridges from a plurality of high density storage slots, such as HD slots 112 within a tape library or one or more interconnected tape library frames similar to tape library frame 102 (i.e., within one or more interconnected tape library frames dedicated for tape storage), and transporting the one or more tape cartridges to tape drives 108 for read and write execution. In one embodiment, tape gripper 104 provides additional tape cartridge storage space affixed directly to the top, bottom, or back of the tape gripper housing. In one embodiment, tape gripper 104 can be configured to hold up to five additional tape cartridges (5x tape cartridges) in a cartridge cache affixed to the tape gripper housing. In one embodiment, tape gripper 104 provides the capability to house one or more scratch cartridges within the integrated cartridge cache for fast database backup operations where mounts can be immediately fulfilled. In one embodiment, tape gripper 104 with an integrated cartridge cache can provide fast access for frequently used tape cartridges. In one embodiment, tape gripper 104 with an integrated cartridge cache can improve shuffle time for cartridges stored in a last position in high density storage slots. In one embodiment, tape gripper 104 with an integrated cartridge cache can provide tape cartridges for drive get and put operations to dismount and load a drive at nearly the same time utilizing an algorithm to collect one or more tape cartridges while moving to the drive. In one embodiment, tape gripper 104 includes additional internal and external components, as depicted and described in further detail with respect to FIGS. 2-4.

In one embodiment, XY accessor 106 is an assembly for manipulating tape gripper 104 within a tape library frame, such as tape library frame 102 and a plurality of interconnected tape library frames within a tape library. In one embodiment, XY accessor 106 is capable of moving tape gripper 104 up and down on a Y-axis, left and right on an X-axis, and diagonally on a Z-axis. XY accessor 106 includes an electronic motor (not shown), or any other suitable mechanism facilitating movement of the assembly within a tape library frame, such as tape library frame 102. For example, XY accessor 106 enables tape gripper 104 within tape library frame 102 to move up, down, left, right, and diagonally through the tape library frame, such as tape library frame 102, or one or more interconnected tape library frames until tape gripper 104 reaches a destination, such as a tape drive, such as tape drives 108, a high density storage slot, such as HD slots 112, or an interconnected tape library frame similar to tape library frame 102. Within that tape library frame, XY accessor 106 enables tape gripper 104 to move up a column of stored tape cartridges to retrieve a plurality of tape cartridges from one or more high density storage slots, such as HD slots 112, within that tape library frame. Once a tape cartridge is retrieved, XY accessor 106 enables tape gripper 104 to move back to tape library frame 102 (when moved to an interconnected tape library frame) with the plurality of retrieved tape cartridges and insert the tape into one or more tape drives, such as tape drives 108 for executing read and write information.

In one embodiment, tape drives 108 are data storage devices for executing read and write information on one or more tape cartridges. In one embodiment, tape drives 108 are arranged in a column within tape library frame 102. In one embodiment, tape drives 108 and the one or more tape cartridges are stored separately within tape library frame 102, or within a tape library including one or more tape library frames, such as tape library frame 102 (i.e., tapes are stored separately from tape drives 108, in one or more tape library frames dedicated for tape storage).

In one embodiment, X-rail 110 is a rail assembly enabling XY accessor 106 to move left and right within a tape library to one or more interconnected tape library frames similar to tape library frame 102. In one embodiment, XY accessor 106 is attached to X-rail 110 by a wheel-on-rail assembly, or any other suitable mechanism for attaching an accessor assembly to a rail to facilitate movement of a tape gripper, such as tape gripper 104, between one or more interconnected tape library frames along an X-axis.

In one embodiment, HD slots 112 are high density storage slots within a tape library frame, such as tape library frame 102, capable of storing up to five tape cartridges (5x) stacked in a row within a single slot space within the tape library frame, such as tape library frame 102. For example, high density slots, such as HD slots 112, are capable of storing up to five tape cartridges in a tiered orientation, with a tier 5 position on linear tape open (LTO) tape cartridges being a first tape cartridge loaded into the slot (rear-most tape cartridge), and a tier 1 position being a last tape cartridge loaded into the slot (forward-most tape cartridge). Where a tier 5 position LTO tape cartridge is requested, the LTO tape cartridges forward of it (up to four cartridges), need to be removed in order to access the requested LTO tape cartridge. In alternative embodiments, high density slots, such as HD slots 112, are capable of storing up to four tape cartridges in a tiered orientation, with a tier 4 position on enterprise tape cartridges being a first tape cartridge loaded into the slot (rear-most tape cartridge), and a tier 1 position being a last tape cartridge loaded into the slot (forward-most tape cartridge). Where a tier 4 position enterprise tape cartridge is requested, the enterprise tape cartridges forward of it (up to three cartridges), need to be removed in order to access the requested enterprise tape cartridge.

Figure 2:
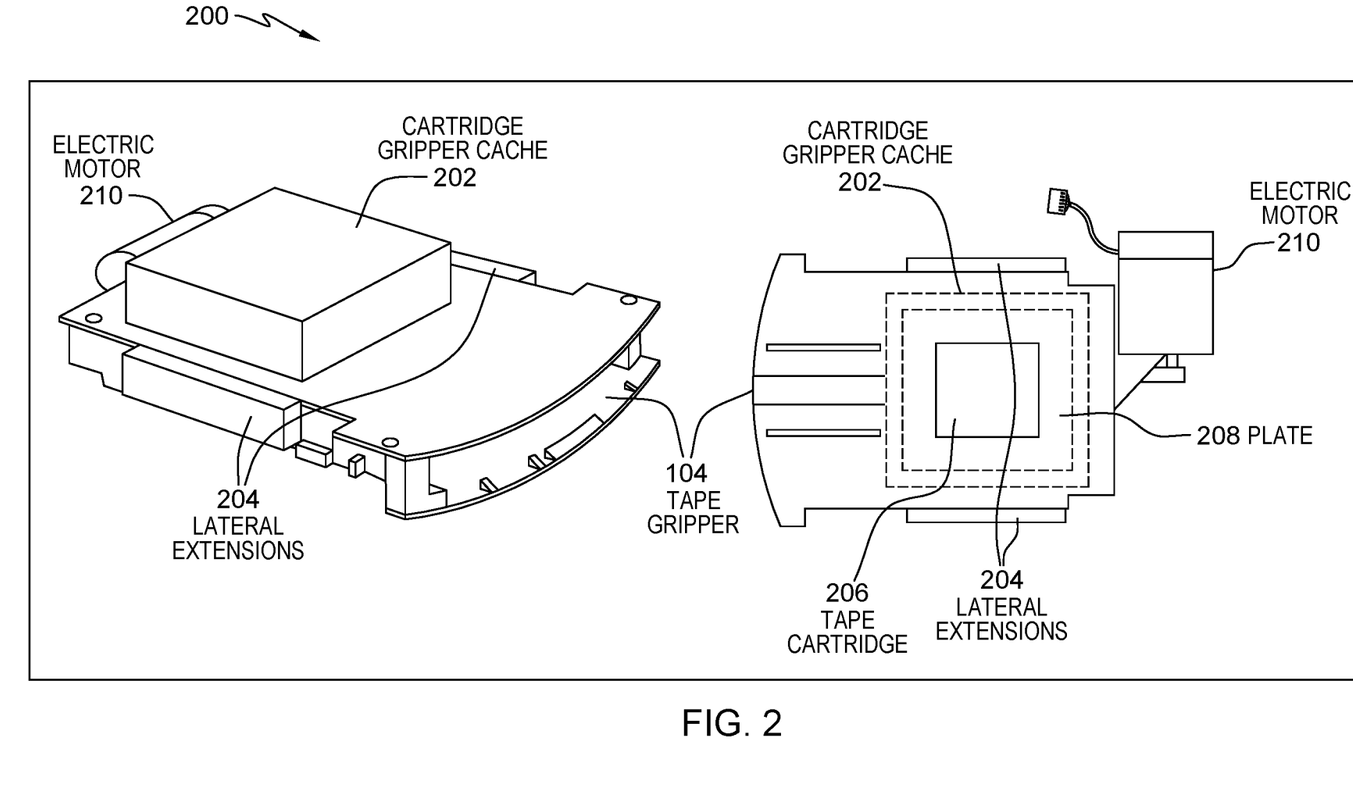
FIG. 2 is a configuration diagram of a tape gripper of a tape library frame, in accordance with an embodiment of the present invention.

FIG. 2 is a configuration diagram of a tape gripper of a tape library frame, such as tape gripper 104 of tape library frame 102, generally designated 200, in accordance with an embodiment of the present invention.

In one embodiment, tape gripper 104 provides additional tape cartridge storage space within the tape gripper housing. FIG. 2 depicts a topside view (right image) and an inverted (underside) view (left image) of tape gripper 104 that includes a cartridge gripper cache, such as cartridge gripper cache 202, affixed to a bottom portion (underside) of tape gripper 104, for storing tape cartridges, such as tape cartridge 206, stacked internally within cartridge gripper cache 202. In alternative embodiments, cartridge gripper cache 202 may be affixed on a top portion (not shown) of tape gripper 104, or on a back portion (not shown) of tape gripper 104 based, at least in part, on internal and structural constraints of a tape library frame, such as tape library frame 102. In one embodiment, cartridge gripper cache 202 of tape gripper 104 can be sized to hold (i.e., store, accept, accommodate) up to five additional tape cartridges (6x tape cartridges total, including a tape cartridge in a belt pathway of the tape gripper plus the five additional tape cartridges in the cache). In alternative embodiments, cartridge gripper cache 202 of tape gripper 104 can be sized to hold three additional tape cartridges (4x tape cartridges total, including a tape cartridge in a belt pathway of the tape gripper plus the three additional tape cartridges in the cache). In one embodiment, cartridge gripper cache 202 of tape gripper 104 is capable of housing LTO tape cartridges, enterprise tape cartridges, and any other tape cartridges capable of being stored within a tape library frame. In alternative embodiments, cartridge gripper cache 202 may be adaptable to function with other tape cartridges and tape library frames known in the art, and as such, the examples discussed above should not be construed as limiting embodiments.

In one embodiment, tape gripper 104 includes lateral extensions 204 on each a first side and a side opposite the first side of the housing of tape gripper 104 to accommodate gripper finger release and tape cartridge caching operations within tape gripper 104, where the first side is perpendicular to an open portion of tape gripper 104, spanning from the open portion of the housing of tape gripper 104 to a closed portion of the housing of tape gripper 104, and the side opposite the first side is parallel to the first side, spanning from the open portion of the housing of tape gripper 104 to the closed portion of the housing of tape gripper 104. In one embodiment, lateral extensions 204 are modifications to the housing of tape gripper 104 that create an expanded internal area within the housing of tape gripper 104 above cartridge gripper cache 202 that extends outward beyond existing dimensions of the housing of tape gripper 104. The expanded internal area created by lateral extensions 204 facilitates opening of each of a first gripper finger and a gripper finger opposite the first gripper finger within the housing of tape gripper 104 when fully retracted into the housing of tape gripper 104, and release of a tape cartridge, such as tape cartridge 206, within the housing of tape gripper 104 onto a plate, such as plate 208, oriented above and centered to cartridge gripper cache 202. In one embodiment, plate 208 is capable of being raised and lowered passively within cartridge gripper cache 202 utilizing springs mounted inside cartridge gripper cache 202. In alternative embodiments, plate 208 is capable of being raised and lowered actively within cartridge gripper cache 202 utilizing a separate electric motor affixed to a spindle. Aspects of tape gripper 104 related to a cartridge mount scenario and tape cartridge caching operation, and associated components, will be discussed in further detail in subsequent figures.

Figure 3:
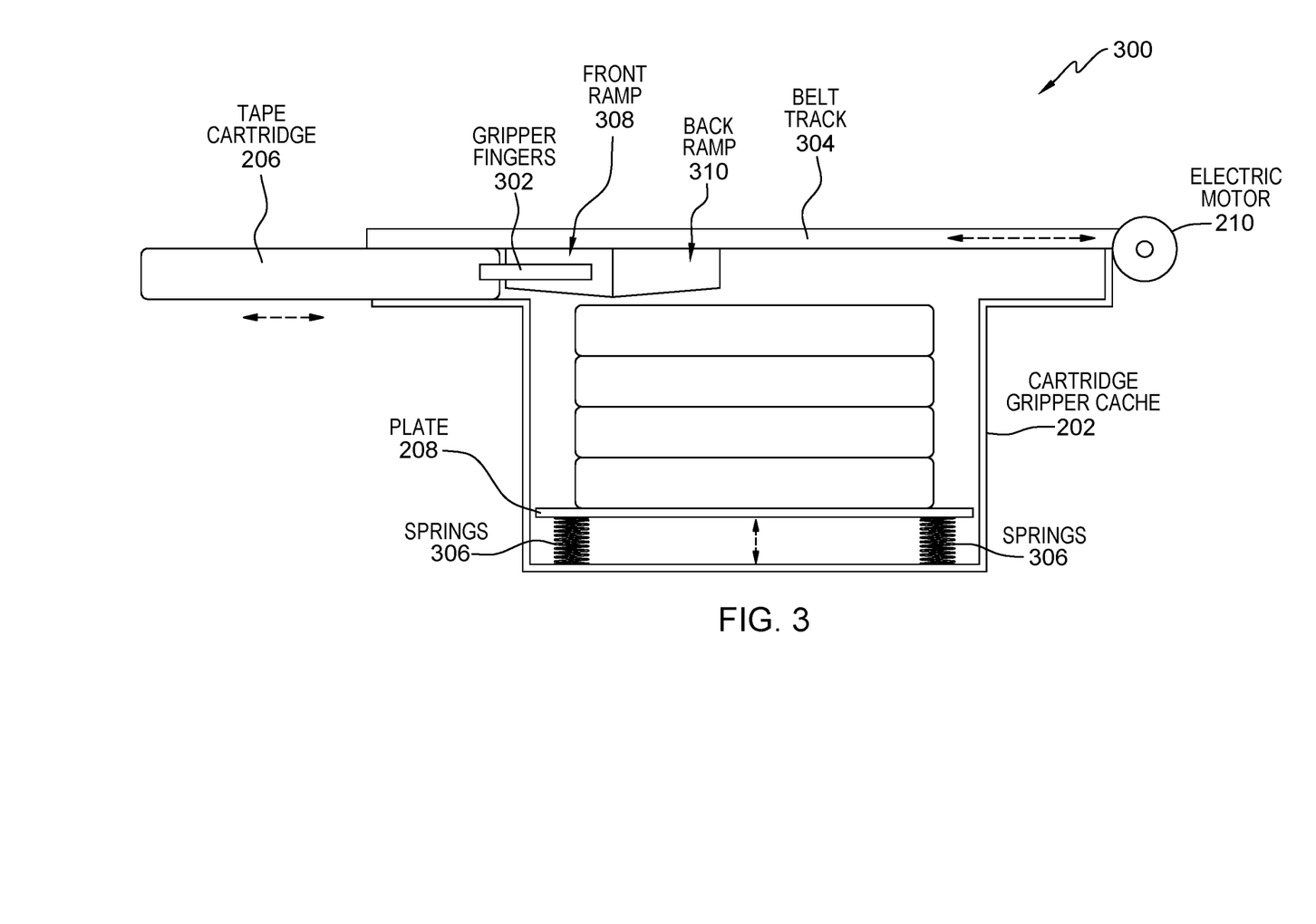
FIG. 3 is a configuration diagram of a side view of a tape gripper of a tape library frame, in accordance with an embodiment of the present invention.

FIG. 3 is a configuration diagram of a side view of a tape gripper of a tape library frame, such as tape gripper 104 of tape library frame 102, generally designated 300, in accordance with an embodiment of the present invention.

In one embodiment, tape gripper 104 includes gripper fingers 302 and belt track 304 for loading and unloading one or more tape cartridges, such as tape cartridge 206. In one embodiment, tape gripper 104 includes electric motor 210 to move belt track 304 back and forth, which facilitates opening and closing of gripper fingers 302 based on positioning within the housing of tape gripper 104. FIG. 3 depicts tape gripper 104 loading a tape cartridge, such as tape cartridge 206, to be cached in cartridge gripper cache 202, which has four tape cartridges previously cached. In one embodiment, tape gripper 104 includes plate 208 that compresses springs 306 within cartridge gripper cache 202 as more tape cartridges, such as tape cartridge 206, are loaded into cartridge gripper cache 202. One or more tape cartridges, such as tape cartridge 206, are loaded into cartridge gripper cache 202 utilizing gripper fingers 302 driven by belt track 304.

In one embodiment, gripper fingers 302 includes each of a first gripper finger and a gripper finger opposite the first gripper finger affixed to a first side of a gripper finger module housing and a side opposite the first side of the gripper finger module, respectively, for grasping a tape cartridge, such as tape cartridge 206. In one embodiment, gripper fingers 302 and the associated gripper finger module includes a front ramp 308, which is a first tapered portion of the gripper finger module housing, oriented towards an open portion of the housing of tape gripper 104, and a back ramp 310, which is a tapered portion of the gripper finger module housing opposite the first tapered portion, oriented towards a closed portion of the housing of tape gripper 104 opposite the open portion of the housing of tape gripper 104, which allows gripper fingers 302 and the associated gripper finger module housing to travel over any previously loaded tape cartridges, similar to tape cartridge 206, cached within cartridge gripper cache 202 during loading and unloading operations. For example, during a tape cartridge loading operation, gripper fingers 302 moves inward towards cartridge gripper cache 202 with a tape cartridge, back ramp 310 of the gripper finger module housing travels over the previously loaded tape cartridge in the topmost position within cartridge gripper cache 202, compressing springs 306 under plate 208, thus lower plate 208 one tape cartridge position. In another example, during a tape cartridge unloading operation, gripper fingers 302 moves outward towards cartridge gripper cache 202 to grasp a topmost tape cartridge from cartridge gripper cache 202, and once successfully grasped, front ramp 308 of the gripper finger module housing travels over the previously loaded tape cartridge in the second topmost position within cartridge gripper cache 202, and once cleared from the previously loaded tape cartridge, springs 306 under plate 208 decompress, raising plate 208 and the remaining one or more tape cartridges towards belt track 304 to be grasped by gripper fingers 302 and unloaded from tape gripper 104 in subsequent unload operations.

For example, based on a tape cartridge mount scenario, cartridge gripper cache 202 functionality will be dependent on mount requests received by a tape library. Responsive to receiving a mount request (or a series of mount requests) an accessor, such as XY accessor 106, positions tape gripper 104 to a storage slot, such as HD slots 112, containing a requested tape cartridge, such as tape cartridge 206. In one embodiment, tape gripper 104 removes the tape cartridge from the storage slot out utilizing an electric motor, such as electric motor 210, to move gripper fingers, such as gripper fingers 302, along a belt track, such as belt track 304, and loads the tape cartridge into a position on plate 208 above cartridge gripper cache 202.

Responsive to a determination that the tape cartridge is to be stored in cartridge gripper cache 202, the tape cartridge is moved down the tape cartridge to the correct position (if it is the first tape cartridge in cache, the tape cartridge will be moved down one tape cartridge position). In one embodiment, further mount requests position the accessor to a next storage slot position, and tape gripper 104 retrieves a second tape cartridge using gripper fingers 302, from the storage slot and moves the tape cartridge to cartridge gripper cache 202 using belt track 304. As the second tape cartridge moves into position above cartridge gripper cache 202, back ramp 310 of the gripper finger module housing causes springs 306 to depress further, such that each tape cartridge is moved down by one tape cartridge position. Gripper fingers 302 releases tape cartridge 206 on plate 208 and caching second tape cartridge into cartridge gripper cache 202 is performed utilizing front ramp 308 of the gripper finger module housing to depress the second tape cartridge and the first tape cartridge down into cartridge gripper cache 202 one tape cartridge position. In one embodiment, loading and caching of a plurality of tape cartridges continues until the request is fulfilled or until cartridge gripper cache 202 is full. In one embodiment, tape cartridges are cached in cartridge gripper cache 202 according to a first in, first out principle (FIFO principle). Where cartridge gripper cache 202 is full, a final tape cartridge can be loaded into tape gripper 104 within belt track 304 on top of all previously cached tape cartridges.

Responsive to a determination that cartridge gripper cache 202 is full (or mount request complete), the accessor, such as XY accessor 106, moves to a tape drive location to load one or more requested tape cartridges into the tape drive. In one embodiment, tape gripper 104 removes one or more tape cartridges from cartridge gripper cache 202 using gripper fingers 302 until empty, without having to move to multiple tape library storage slots to retrieve each requested tape cartridge individually, thereby improving data access time by reducing the accessor movements for tape cartridge mounts and dismounts. Furthermore, in case of high density (HD) storage slots, such as HD slots 112, shuffling time will be similarly reduced. By utilizing functionality provided by cartridge gripper cache 202, a tape library frame 102 can move XY accessor 106 and tape gripper 104 to HD slots 112 and shuffle redundant cartridges to cartridge gripper cache 202 without moving XY accessor 106 to a secondary shuffle slot space.

In alternative embodiments, where a tape library has two accessors similar to XY accessor 106, with each accessor including up to two tape grippers similar to tape gripper 104, the mount scenario discussed above can happen for each of the cartridge gripper caches similar to cartridge gripper cache 202 (e.g., four cartridge gripper caches across two dual tape grippers on two accessors).

In alternative embodiments, in place or in addition to springs 306, a spindle attached to a secondary electric motor (not shown) similar to electric motor 210 can provide up and down movement of plate 208 associated with the caching operation of one or more tape cartridges, such as tape cartridge 206, within cartridge gripper cache 202. In this embodiment, the secondary electric motor moves plate 208 up and down within cartridge gripper cache 202 during load, unload, and caching operations.

Figure 4:
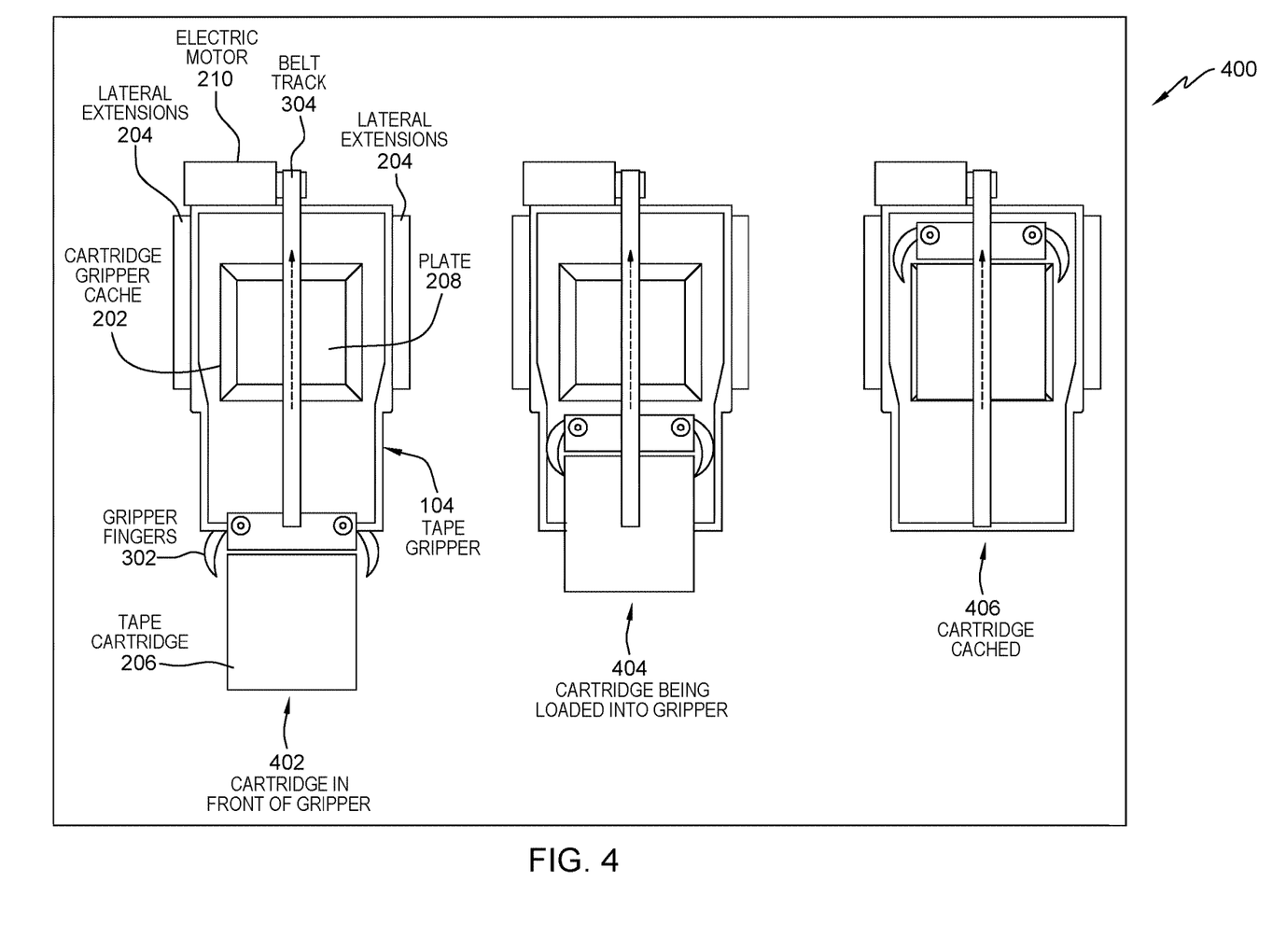
FIG. 4 is a configuration diagram for illustrating a process for caching a tape cartridge within a tape gripper, in accordance with an embodiment of the present invention.

FIG. 4 is a configuration diagram, illustrating a process for caching a tape cartridge within a tape gripper, such as tape gripper 104, generally designated 400, in accordance with an embodiment of the present invention.

Process 400 demonstrates how a tape cartridge, such as tape cartridge 206, will be loaded into tape gripper 104 and released into cartridge gripper cache 202. In one embodiment, tape gripper 104 retrieves a tape cartridge, such as tape cartridge 206, by extending gripper fingers 302 towards tape cartridge 206 utilizing belt track 304 and electric motor 210 (402).

In one embodiment, when gripper fingers 302 and tape cartridge 206 are in a correct position for loading, tape gripper 104 retracts gripper fingers 302 towards the housing utilizing belt track 304 and electric motor 210 such that gripper fingers 302 manually close around tape cartridge 206 from contact with the housing of tape gripper 104 (404).

In one embodiment, as gripper fingers 302 and tape cartridge 206 travel into tape gripper 104, gripper fingers 302 remain closed around tape cartridge 206. When gripper fingers 302 and tape cartridge 206 reach lateral extensions 204 of tape gripper 104, the tapered back ramp portion of the gripper finger module housing causes springs 306 to depress, and gripper fingers 302 begin to release from around tape cartridge 206 as contact with the housing tapers out, with tape cartridge 206 being fully released on a plate, such as plate 208, above cartridge gripper cache 202 (406).

For unloading, the reverse of the above described scenario removes the one or more tape cartridges from cartridge gripper cache 202.

The present invention may be a system, a method and/or a computer program product. The computer program product may include a computer readable storage medium (or media) having computer readable program instructions thereon for causing a processor to carry out aspects of the present invention. In one embodiment, the computer readable storage medium having computer readable program instructions thereon may be internal to a tape library frame, such as tape library frame 102. In other embodiments, the computer readable storage medium having computer readable program instructions thereon may be stored external to a tape library frame, such as tape library frame 102, such that a server computer communicates with tape library frame 102 through a network connection to execute the computer readable program instructions on tape library frame 102.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable) or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems) and computer program products according to embodiments of the invention. It will be understood that each block of the flowchart illustrations and/or block diagrams and combinations of blocks in the flowchart illustrations and/or block diagrams, can be implemented by computer readable program instructions.

These computer readable program instructions may be provided to a processor of a general purpose computer, a special purpose computer or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus or other device to cause a series of operational steps to be performed on the computer, other programmable apparatus or other device to produce a computer implemented process, such that the instructions which execute on the computer, other programmable apparatus or other device implement the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace or to enable others of ordinary skill in the art to understand the embodiments disclosed herein.

The terminology used herein is for the purpose of describing particular embodiments only and is not intended to be limiting of the invention. It should be appreciated that any particular nomenclature herein is used merely for convenience and thus, the invention should not be limited to use solely in any specific function identified and/or implied by such nomenclature. Furthermore, as used herein, the singular forms of "a", "an", and "the" are intended to include the plural forms as well, unless the context clearly indicates otherwise.

What is claimed is:

1. An apparatus for tape cartridge management, the apparatus comprising:
    a tape gripper for storing one or more additional tape cartridges within a housing of the tape gripper, wherein the housing of the tape gripper includes a tape cartridge cache; and
    wherein the tape cartridge cache includes a plate, oriented above and centered to the tape cartridge cache, capable of being raised and lowered within the tape cartridge cache utilizing one or more springs mounted under the plate inside the tape cartridge cache.

2. The apparatus of claim 1, wherein the tape cartridge cache is an expanded internal area integrated within the housing of the tape gripper for holding the one or more additional tape cartridges stacked internally within the tape gripper.

3. The apparatus of claim 1, wherein the tape cartridge cache is integrated within a bottom portion of the housing of the tape gripper.

4. The apparatus of claim 1, wherein the tape cartridge cache is sized to hold five tape cartridges within the tape gripper.

5. The apparatus of claim 1, wherein the housing of the tape gripper includes a lateral extension on each of a first side and a side opposite the first side of the housing of the tape gripper.

6. The apparatus of claim 5, wherein the lateral extension on each of the first side and the side opposite the first side of the housing of the tape gripper are integrated within the housing of the tape gripper to create an expanded internal area within the housing of the tape gripper above the tape cartridge cache.

7. The apparatus of claim 5, wherein the lateral extension on each of the first side and a side opposite the first side of the housing of the tape gripper facilitate opening of a first gripper finger and a gripper finger opposite the first gripper finger within the housing of the tape gripper and release of the one or more additional tape cartridges within the housing of the tape gripper.

8. The apparatus of claim 5, wherein the first side of the housing of the tape gripper is perpendicular to an open portion of the housing of the tape gripper, spanning from the open portion of the housing of the tape gripper to a closed portion of the housing of the tape gripper, and the side opposite the first side is parallel to the first side, spanning from the open portion of the housing of the tape gripper to the closed portion of the housing of the tape gripper.

9. The apparatus of claim 1, wherein the tape gripper includes a first gripper finger and a gripper finger opposite the first gripper finger attached to a housing of a gripper finger module.

10. The apparatus of claim 9, wherein the housing of the gripper finger module includes each of a first tapered portion of the gripper finger module housing and a tapered portion of the gripper finger module housing opposite the first tapered portion.

11. The apparatus of claim 10, wherein the first tapered portion of the gripper finger module housing is oriented towards an open portion of the housing of the tape gripper, and the tapered portion of the gripper finger module housing opposite the first tapered portion is oriented towards a closed portion of the housing of the tape gripper opposite the open portion of the housing of the tape gripper.

12. The apparatus of claim 10, wherein each of the first tapered portion of the gripper finger module housing and the tapered portion of the gripper finger module housing opposite the first tapered portion facilitate travel over the one or more additional tape cartridges stored in the tape cartridge cache during loading and unloading operations.

13. The apparatus of claim 10, wherein each of the first tapered portion of the gripper finger module housing and the tapered portion of the gripper finger module housing opposite the first tapered portion facilitate compression of one or more springs mounted under a plate inside the tape cartridge cache.

14. A method for tape cartridge management, the method comprising:
responsive to receiving a mount request, moving a tape gripper including a tape cartridge cache to a high density storage slot containing a first requested tape cartridge;
removing the first requested tape cartridge from the storage slot utilizing a first gripper finger and a gripper finger opposite the first gripper finger to grasp the first requested tape cartridge;
loading the first requested tape cartridge into the tape gripper to a position on a plate above the tape cartridge cache utilizing an electric motor to move the first gripper finger and the gripper finger opposite the first gripper finger inward along a belt track; and
responsive to the mount request designating that the first requested tape cartridge is to be stored in the tape cartridge cache, releasing the first requested tape cartridge on the plate and caching the first requested tape cartridge into the tape cartridge cache utilizing a first tapered portion of a gripper finger module housing, oriented towards an open portion of the housing of the tape gripper.

15. The method of claim 14, further comprises:
responsive to receiving a second mount request, removing a second requested tape cartridge from the high density storage slot utilizing the first gripper finger and the gripper finger opposite the first gripper finger to grasp the second requested tape cartridge;
loading the second requested tape cartridge into the tape gripper to the position on the plate above the tape cartridge cache utilizing the electric motor to move the first gripper finger and the gripper finger opposite the first gripper finger inward along the belt track;
responsive to the second mount request designating that the second requested tape cartridge is to be stored in the tape cartridge cache, releasing the second requested tape cartridge on top of the first requested tape cartridge cached in the tape cartridge cache; and
caching the second requested tape cartridge into the tape cartridge cache utilizing the first tapered portion of a gripper finger module housing, oriented towards an open portion of the housing of the tape gripper to depress the second requested tape cartridge and the first requested tape cartridge down into the tape cartridge cache one tape cartridge position.

16. The method of claim 14, further comprises:
responsive to receiving a third mount request, removing a third requested tape cartridge from the high density storage slot utilizing the first gripper finger and the gripper finger opposite the first gripper finger to grasp the second requested tape cartridge;
loading the third requested tape cartridge into the tape gripper to the position on the plate above the tape cartridge cache utilizing the electric motor to move the first gripper finger and the gripper finger opposite the first gripper finger inward along the belt track;
responsive to the third mount request designating that the third requested tape cartridge is to be stored in the tape cartridge cache, releasing the third requested tape cartridge on top of the second requested tape cartridge cached in the tape cartridge cache; and
caching the third requested tape cartridge into the tape cartridge cache utilizing the first tapered portion of a gripper finger module housing, oriented towards an open portion of the housing of the tape gripper to depress the third requested tape cartridge, the second requested tape cartridge, and the first requested tape cartridge down into the tape cartridge cache one tape cartridge position.

17. The method of claim 15, wherein releasing the second requested tape cartridge on the first requested tape cartridge further comprises:
utilizing a tapered portion of a gripper finger module housing opposite the first tapered portion, oriented towards a closed portion of the housing of the tape gripper to travel over the first requested tape cartridge cached in the tape cartridge cache, wherein traveling over the first requested tape cartridge with the tapered portion of the gripper finger module housing opposite the first tapered portion compresses one or more springs mounted under a plate below the first requested tape cartridge and lowers the first requested tape down into the tape cartridge cache one tape cartridge position.

18. The method of claim 16, wherein releasing the third requested tape cartridge on the second requested tape cartridge further comprises:
utilizing a tapered portion of a gripper finger module housing opposite the first tapered portion, oriented towards a closed portion of the housing of the tape gripper to travel over the second requested tape cartridge cached in the tape cartridge cache, wherein traveling over the second requested tape cartridge with the tapered portion of the gripper finger module housing opposite the first tapered portion compresses one or more springs mounted under a plate below the first requested tape cartridge and lowers the second requested tape cartridge and the first requested tape cartridge down into the tape cartridge cache one tape cartridge position.

19. The method of claim 14, further comprises:

moving the tape gripper to a tape drive location to load one or more requested tape cartridges into a tape drive; and removing the one or more requested tape cartridges from the tape cartridge cache utilizing the first gripper finger and the gripper finger opposite the first gripper finger, wherein removing each of the one or more requested tape cartridges from the tape cartridge cache raises any remaining one or more requested tape cartridges one tape cartridge position in the tape cartridge cache.

\* \* \* \* \*